United States Patent [19]

Okada

[11] Patent Number: 5,076,059
[45] Date of Patent: Dec. 31, 1991

[54] ENERGY RECOVERY SYSTEM FOR MOTOR VEHICLES

[75] Inventor: Masaki Okada, Yokohama, Japan
[73] Assignee: Isuzu Motors Limited, Tokyo, Japan
[21] Appl. No.: 478,950
[22] Filed: Feb. 12, 1990
[30] Foreign Application Priority Data Feb. 27, 1989 [JP] Japan ..................... 1-046042

[51] Int. Cl.$^5$ ............................................. F02B 33/44
[52] U.S. Cl. ............................. 60/608; 123/198 DB
[58] Field of Search .................... 60/601, 603, 608; 123/198 D, 198 DB

[56] References Cited

U.S. PATENT DOCUMENTS

| 4,445,336 | 5/1984 | Inoue | 60/603 |
| 4,745,755 | 5/1988 | Kawamura | 60/608 |
| 4,878,342 | 11/1989 | Kawamura | 60/608 |
| 4,882,905 | 11/1989 | Kawamura | 60/608 |
| 4,945,879 | 8/1990 | Fijimoto et al. | 123/198 D B |
| 4,979,481 | 12/1990 | Shimomura et al. | 123/198 D B |

Primary Examiner—Richard A. Bertsch
Assistant Examiner—Michael I. Kocharov
Attorney, Agent, or Firm—Staas & Halsey

[57] ABSTRACT

An energy recovery system for a motor vehicle having a gasoline engine and an exhaust energy recovery device disposed in an exhaust system of the engine. When the amount of depression of an accelerator pedal is zero and the speed of travel of the motor vehicle and/or the rotational speed of the engine is higher than a predetermined value, it is decided that an engine brake is applied to the motor vehicle at the time the motor vehicle is decelerated or runs down a slope. Then, fuel to be supplied to the engine is cut off, and the throttle valve is fully opened. As a result, the engine functions as a compressor, and air compressed by the engine operates the exhaust energy recovery device. The braking energy produced by the engine brake is now effectively converted into and recovered as electric energy.

5 Claims, 3 Drawing Sheets

ENERGY RECOVERY SYSTEM FOR MOTOR VEHICLES

BACKGROUND OF THE INVENTION

The present invention relates to a running energy recovery system for use on a motor vehicle which is powered by a gasoline engine.

Various proposals have been made to recover the energy of exhaust gases emitted from engines on motor vehicles.

For example, Japanese Laid-Open Patent Publication No. 60(1985)-195329 discloses an exhaust energy recovery system wherein a rotary electric machine which can selectively operate as a motor or a generator is mounted on the rotatable shaft of a turbocharger that is driven by the energy of exhaust gases emitted from an engine. In a low-speed, high-load operating range of the engine, the rotary electric machine operates as a motor which increases the rotational speed of the turbocharger for increasing the boost pressure. In a high-speed or low-load operating range of the engine, the rotary electric machine operates as a generator which generates electric energy that will be recovered.

Japanese Laid-Open Patent Publication No. 59(1984)141714 also discloses an energy recovery system which comprises a first rotary electric machine selectively operable as a motor or a generator and mounted on the rotatable shaft of a turbocharger, and a second rotary electric machine selectively operable as a motor or a generator and coupled to the rotatable shaft of the engine on a motor vehicle. When the first rotary electric machine operates as a generator, electric power generated thereby is supplied to the second rotary electric machine to operate it as a motor, so that the energy of exhaust gases emitted from the engine can be returned to the engine. When the motor vehicle is braked, the second rotary electric machine operates as a generator which converts the braking energy into electric energy to be recovered.

Gasoline engines are controlled such that the ratio of intake air to fuel (A/F ratio) will be a stoichiometric A/F ratio. When the gasoline engine operates under a low load, the opening of the throttle valve is restricted to reduce the rate of intake air, and hence the rate of exhaust gases is also small. Therefore, the rotary electric machine of the energy recovery system disclosed in the former publication has a little chance to generate electric power in a low-load operating range of the engine. Particularly when the accelerator pedal is released or is no longer depressed at the time the motor vehicle is decelerated or running downhill, the opening of the throttle valve is minimized to reduce the rate of intake air, and hence the rate of exhaust gases led to the turbocharger is greatly reduced. Consequently, any work done by the turbocharger becomes almost zero, and it becomes impossible to recover the energy in the form of generated electric power.

According to the energy recovery system disclosed in the latter publication, when the motor vehicle is braked, the rotary electric machine coupled to the rotatable shaft of the engine operates as a generator which recovers electric energy from the braking energy. This energy recovery system is however complex and highly costly since the second rotary electric machine has to be coupled to the rotatable shaft of the engine.

SUMMARY OF THE INVENTION

It is an object of the present invention to provide an energy recovery system for a motor vehicle which is powered by a gasoline engine that is associated with an energy recovery means disposed in an engine exhaust system for recovering exhaust energy, the energy recovery system being capable of effectively recovering braking energy when the motor vehicle is decelerated or running down a slope.

Another object of the present invention is to provide an energy recovery system for a motor vehicle which is powered by a gasoline engine, the energy recovery system being capable of effectively converting braking energy into electric energy and recovering the electric energy when the motor vehicle is decelerated or running down a slope.

According to the present invention, there is provided an energy recovery system in a motor vehicle having a gasoline engine including intake and exhaust pipes, an accelerator pedal, comprising fuel supply means for supplying the gasoline engine with fuel at a rate commensurate with the amount of depression of the accelerator pedal, a throttle valve disposed in the intake pipe, a throttle actuator for actuating the throttle valve in response to the amount of depression of the accelerator pedal, energy recovery means disposed in the exhaust pipe, for recovering the energy of exhaust gases emitted from the engine, an accelerator pedal movement sensor for detecting the amount of depression of the accelerator pedal, a speed sensor for detecting the speed of travel of the motor vehicle and/or the rotational speed of the engine, and control means for controlling the fuel supply means to cut off fuel to be supplied to the engine and for controlling the throttle actuator to fully open the throttle valve when the amount of depression of the accelerator pedal is zero and the speed of travel of the motor vehicle and/or the rotational speed of the engine is higher than a predetermined value, as indicated by detected signals from the accelerator pedal movement sensor and the speed sensor.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
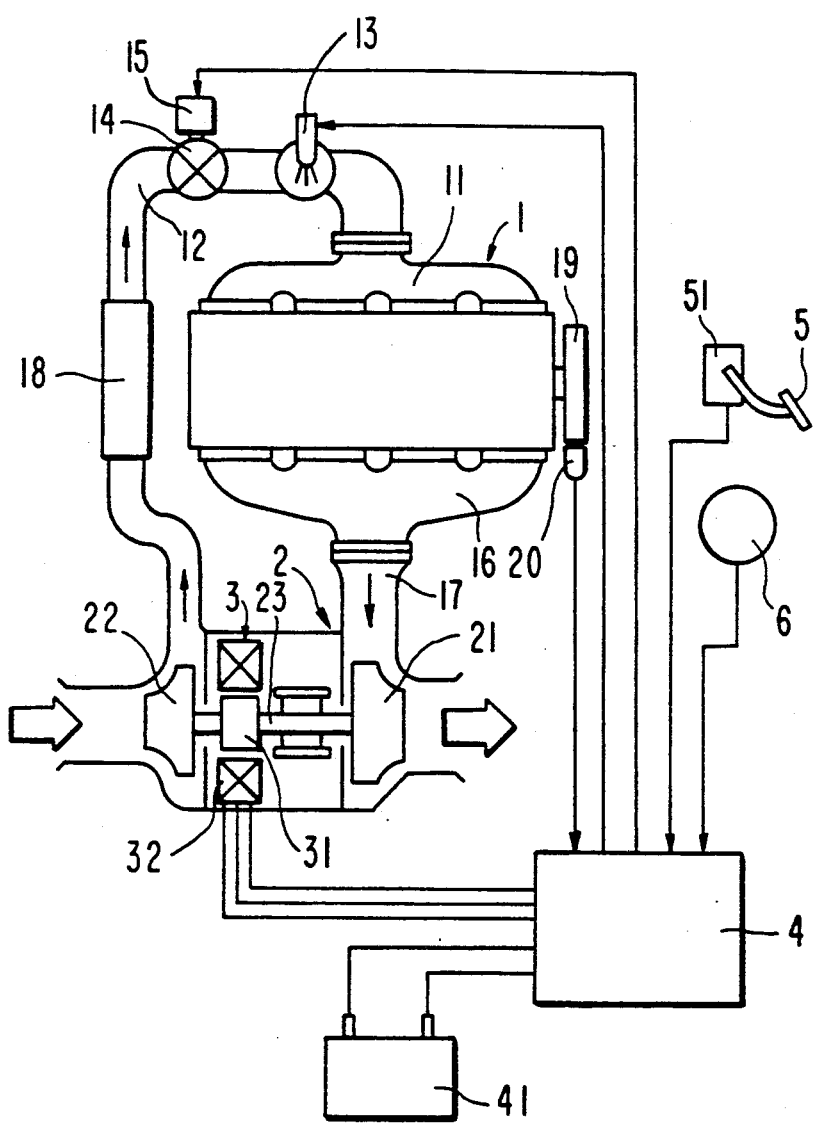
FIG. 1 is a schematic view, partly in block form, of an energy recovery system for a motor vehicle according to an embodiment of the present invention.

FIG. 1 shows an energy recovery system according to an embodiment of the present invention.

An engine 1 mounted on a motor vehicle and associated with the energy recovery system has an intake manifold 11 to which there is coupled an intake pipe 12 with a fuel injector or a fuel supply means 13 being disposed therein. A throttle valve 14 for controlling the rate of intake air to be introduced into the engine 1 is disposed in the intake pipe 12 upstream of the fuel injector 13. The throttle valve 14 is operated by a throttle actuator 15 which is controlled by a controller 4 depending on the depth or amount by which an accelerator pedal 5 is depressed.

The engine 1 also has an exhaust manifold 16 to which there is connected an exhaust pipe 17 that is coupled to a turbocharger 2. The turbocharger 2 comprises a turbine 21 drivable by the energy of exhaust gases emitted from the engine 1, and a compressor 22 coupled to a rotatable shaft 23 that is also connected to the turbine 21. The compressor 22 has an outlet connected to the intake pipe 12. A rotary electric machine 3 which is selectively operable as a motor or a generator is mounted on the rotatable shaft 23 of the turbocharger 2. The rotary electric machine 3 comprises a rotor 31 mounted on the shaft 23 and a stator 32 disposed around the rotor 31. When the engine 1 rotates at a low speed and under a high load, electric power stored in a battery 41 is supplied to the stator 32, so that the rotary electric machine 3 operates as a motor to increase the rotational speed of the compressor 22, thereby assisting the compressor 22 in supercharging the engine 1 and hence increasing the output power of the engine 1. When the engine 1 rotates at a high speed and under a low-load, the rotary electric machine 3 is driven by the energy of exhaust gases emitted from the engine 1 and operates as a generator which converts the exhaust energy into electric energy to be recovered. When the motor vehicle is braked at the time it is decelerated or runs down a slope, the rotary electric machine 3 also operates as a generator.

An intercooler 18 is disposed in the intake pipe 12, for cooling high-temperature air which is adiabatically compressed by the compressor 22 and flows through the intake pipe 12.

An engine rotational speed sensor 20 for detecting the rotational speed of the engine 1 is disposed in confronting relation to a flywheel 19 of the engine 20. An accelerator pedal movement sensor 51 for detecting the depth or amount by which the accelerator pedal 5 is depressed is operatively coupled to the accelerator pedal 5. A vehicle speed sensor 6 detects the speed at which the vehicle runs based on the rotational speed of the output shaft of the transmission (not shown) of the motor vehicle. Detected signals from these sensors 20, 51, 6 are sent to the controller 4.

The controller 4 comprises a microcomputer which has a central processing unit for effecting arithmetic operations, various memories for storing a control program, the results of arithmetic operations, and detected data from the sensors, and an input/output port. When the amount of depression of the accelerator pedal 5 is zero and the speed the engine 1 are higher than respective predetermined values, as detected by the sensors 20, 51, 6, the controller 4 controls the fuel injector 13 to cut off fuel to be supplied to the engine 1 and also controls the throttle actuator 15 to fully open the throttle valve 14.

The battery 14 serves as a power supply to operate the rotary electric machine 3 as a motor and also to energize the controller 4, and also serves to store electric power which is generated by the rotary electric machine 3 as it operates as a generator.

Figure 2:
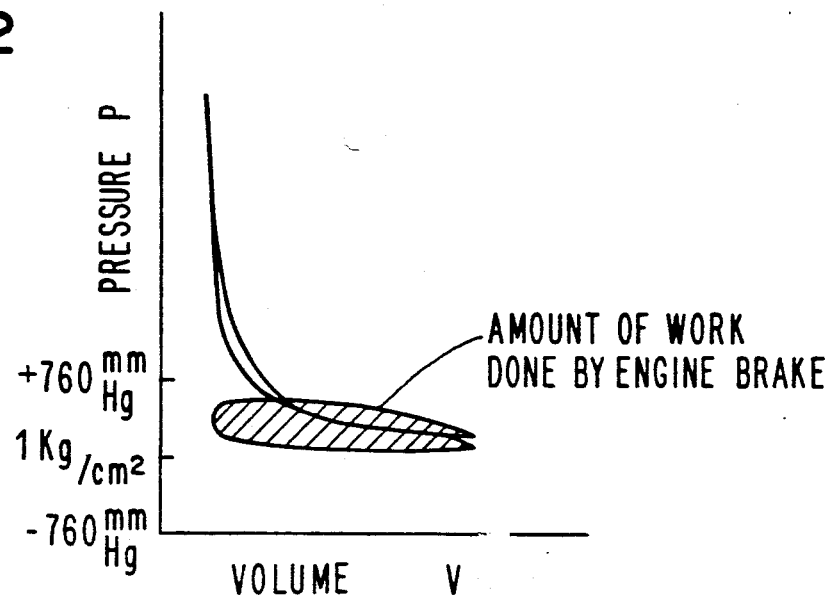
FIG. 2 is a graph showing the relationship between the pressure (P) and volume (V) of an engine associated with the energy recovery system.
Figure 4:
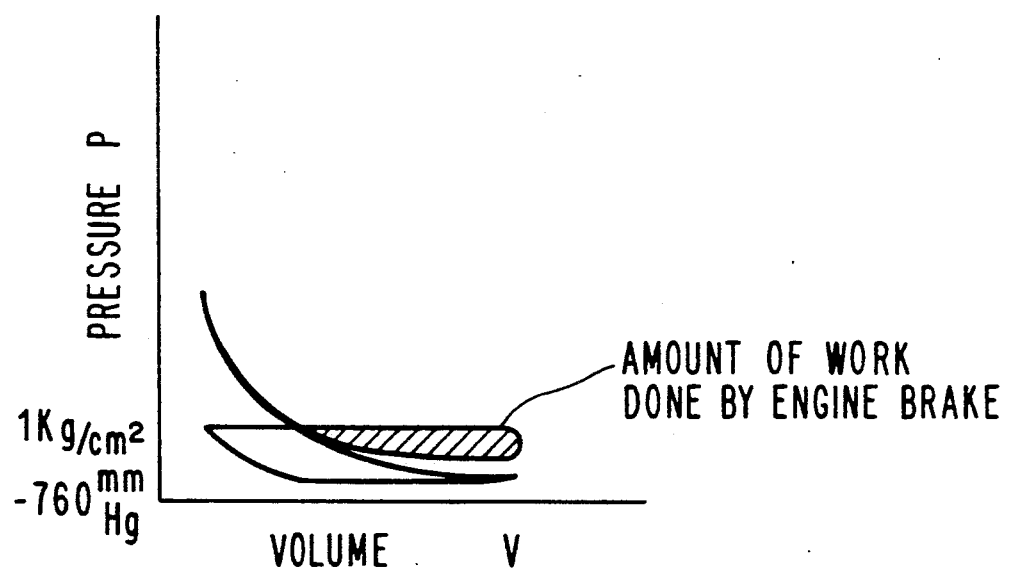
FIG. 4 is a graph showing the relationship between the pressure (P) and volume (V) of a conventional engine.

When the engine 1 is driven by the running energy of the motor vehicle at the time the motor vehicle is decelerated or runs down a slope, the accelerator pedal 5 is released or the amount of its depression becomes zero. If the vehicle speed and/or the engine rotational speed is higher than a predetermined value at this time, then the controller 4 controls the fuel injector 13 to cut off fuel to be supplied to the engine 1, and also controls the throttle actuator 15 to fully open the throttle valve 14. Since the throttle valve 14 is fully opened even if the accelerator 5 is not depressed at all, therefore, the engine 1 sufficiently draws in air, and functions as a compressor. As a result, the turbine 21 of the turbocharger 2 is driven by compressed air discharged from the engine 1, and the compressor 22 is driven by the turbine 21, thereby increasing the boost pressure. Since the rotational speed of the turbocharger 2 is increased by such operation, the rotary electric machine 3 mounted on the rotatable shaft 23 of the turbocharger 2 operates as a generator, and the battery 41 can be charged by electric power which is generated by the rotary electric machine 3. With the embodiment of the present invention, as described above, the braking energy applied to the motor vehicle when it is decelerated or runs downhill can effectively be converted into and recovered as electric energy. FIG. 2 shows a P(pressure)-V(volume) diagram of the engine at the time the engine brake is applied to the motor vehicle. FIG. 4 shows a P-V diagram of a conventional gasoline engine at the time the throttle valve of the engine is closed when the engine brake is applied to the motor vehicle with the gasoline engine mounted. Comparison between FIGS. 2 and 4 indicates that the amount of work (represented by the hatched area) done by the engine brake according to the illustrated embodiment, and hence the engine brake power, are larger than the conventional engine.

Figure 3:
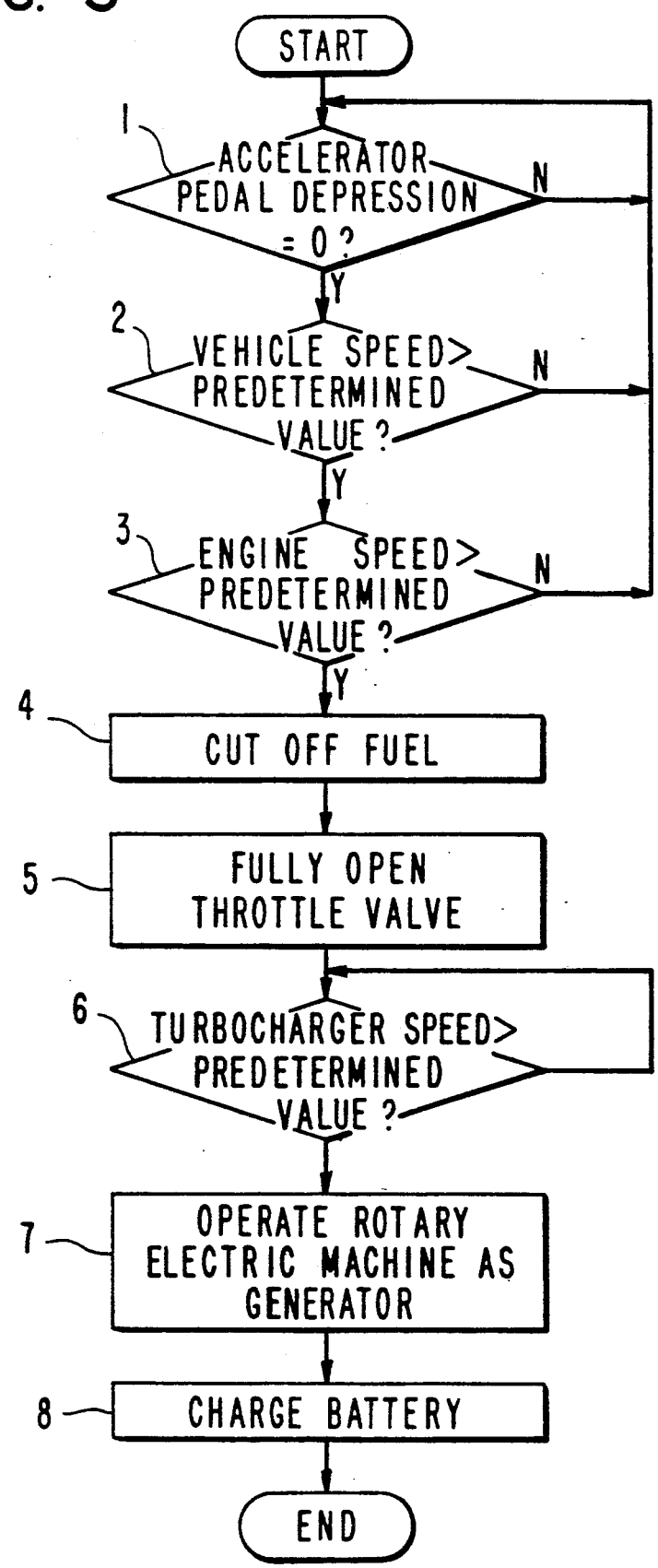
FIG. 3 is a flowchart of a processing sequence of the energy recovery system.

FIG. 3 is a flowchart of a processing sequence of the energy recovery system according to the present invention. The control operation of the energy recovery system will now be described below with reference to FIG. 3.

The controller 4 determines whether the amount of depression of the accelerator pedal 5 is zero or not based on the detected signal from the accelerator pedal movement sensor 51 in a step 1. If the amount of depression of the accelerator pedal 5 is zero, then control proceeds to a step 2 in which the controller 4 determines whether the vehicle speed is higher than a predetermined value, such as 20 km/h for example, based on the detected signal from the vehicle speed sensor 6. If the vehicle speed is higher than 20 km/h, then the controller 4 determines whether the engine rotational speed is higher than a predetermined value, such as 1500 rpm for example, based on the detected signal from the engine rotational speed sensor 20 in a step 3. In this manner, the amount of depression of the accelerator pedal 5, the vehicle speed, and the engine rotational speed are checked in the respective steps 1, 2, 3. If the amount of depression of the accelerator pedal 5 is zero and the vehicle speed and the engine rotational speed are higher than the respective predetermined values, then the controller 4 decides that an engine brake is being applied to the motor vehicle at the time the motor vehicle is decelerated or runs down a slope, and control goes to a step 4. In the step 4, the controller 4 applies a fuel cut-off signal to the fuel injector 13 to cut off fuel to be supplied to the engine 1. Then, the controller 4 applies a control signal to the throttle actuator 15 to fully open the throttle valve 14 in a step 5.

Thereafter, the controller 4 reads in the frequency of the electric power generated by the stator 32 of the rotary electric machine 3 to check the rotational speed of the turbocharger 2. If the rotational speed of the turbocharger 2 is higher than a predetermined value, then the controller 4 decides that the rotary electric machine 3 can generate sufficient electric power. Consequently, the rotary electric machine 3 operates as a generator to generate electric power in a step 7, and then the generated electric power is supplied to the battery 41 to charge the battery 41.

If the accelerator pedal 5 is depressed and the vehicle speed and the engine rotational speed are higher than the respective predetermine values in the steps 1, 2, 3, then control returns to the step 1 to repeat these steps.

With the embodiment of the present invention, the amount of depression of the accelerator pedal and the vehicle speed and the engine rotational speed are checked. If the amount of depression of the accelerator pedal is zero and the vehicle speed and the engine rotational speed are higher than the respective predetermined values, then it is decided that an engine brake is being applied to the motor vehicle at the time it is decelerated or runs down a slope. Fuel supplied to the engine is now cut off, and the throttle valve is fully opened. Accordingly, the engine draws in sufficient air and functions as a compressor. Air compressed by the engine drives the turbine of the turbocharger to increase the rotational speed of the turbocharger, where upon the rotary electric machine generates electric power. Therefore, the braking energy produced when the engine brake is applied to the motor vehicle is effectively converted into and recovered as electric energy.

When the engine brake is applied, the engine itself functions as a powerful compressor as described above. Thus, the engine brake force can be increased.

Although a certain preferred embodiment has been shown and described, it should be understood that many changes and modifications may be made therein without departing from the scope of the appended claims.

What is claimed is:

1. An energy recovery system in a motor vehicle having a gasoline engine including intake and exhaust pipes, and an accelerator pedal, comprising:
   fuel supply means for supplying the gasoline engine with fuel at a rate commensurate with the amount of depression of the accelerator pedal;
   a throttle valve disposed in the intake pipe;
   a throttle actuator for actuating the throttle valve in response to the amount of depression of the accelerator pedal;
   energy recovery means disposed in the exhaust pipe, for recovering the energy of exhaust gases emitted from the engine;
   an accelerator pedal movement sensor for detecting the amount of depression of the accelerator pedal;
   a speed sensor for detecting the speed of travel of the motor vehicle; and
   control means for controlling said fuel supply means to cut off fuel to be supplied to the engine and for controlling said throttle actuator to fully open said throttle valve when the amount of depression of the accelerator pedal is zero and the speed of travel of the motor vehicle is higher than a predetermined value, as indicated by detected signals from said accelerator pedal movement sensor and said speed sensor.

2. An energy recovery system in a motor vehicle having a gasoline engine including intake and exhaust pipes, and an accelerator pedal, comprising:
   fuel supply means for supplying the gasoline engine with fuel at a rate commensurate with the amount of depression of the accelerator pedal;
   a throttle valve disposed in the intake pipe;
   a throttle actuator for actuating the throttle valve in response to the amount of depression of the accelerator pedal;
   energy recovery means disposed in the exhaust pipe, for recovering the energy of exhaust gases emitted from the engine;
   an accelerator pedal movement sensor for detecting the amount of depression of the accelerator pedal;
   a speed sensor for detecting the rotational speed of the engine; and
   control means for controlling said fuel supply means to cut off fuel to be supplied to the engine and for controlling said throttle actuator to fully open said throttle valve when the amount of depression of the accelerator pedal is zero and the rotational speed of the engine is higher than a predetermined value, as indicated by detected signals from said accelerator pedal movement sensor and said speed sensor.

3. An energy recovery system in a motor vehicle having a gasoline engine including intake and exhaust pipes, and an accelerator pedal, comprising:
   fuel supply means for supplying the gasoline engine with fuel at a rotate commensurate with the amount of depression of the accelerator pedal;
   a throttle valve disposed in the intake pipe;
   a throttle actuator for actuating the throttle valve in response to the amount of depression of the accelerator pedal;
   energy recovery means disposed i the exhaust pipe, for recovering the energy of exhaust gases emitted from the engine;
   an accelerator pedal movement sensor for detecting the amount of depression of the accelerator pedal;
   a first speed sensor for detecting the speed of travel of the motor vehicle;
   a second speed sensor for detecting the rotation speed of the engine; and
   control means for controlling said fuel supply means to cut off fuel to be supplied to the engine and for controlling said throttle actuator to fully open said throttle valve when the amount of depression of the accelerator pedal is zero and the speed of travel of the motor vehicle and the rotational speed of the engine is higher than a predetermined value, as indicated by detected signals from said accelerator pedal movement sensor and said first and second speed sensors.

4. An energy recovery system according to claim 3, wherein said energy recovery means comprises an exhaust turbine drivable by the energy of exhaust gases and a generator drivable by said exhaust turbine.

5. An energy recovery system according to claim 3, wherein said energy recovery means comprises an exhaust turbine drivable by the energy of exhaust gases, a compressor mounted on a rotatable shaft coupled to said exhaust turbine and disposed in the intake pipe of the engine, and a rotary electric machine mounted on said rotatable shaft and selectively operable as a motor or a generator.

* * * * *

UNITED STATES PATENT AND TRADEMARK OFFICE
CERTIFICATE OF CORRECTION

PATENT NO. : 5,076,059
DATED : December 31, 1991
INVENTOR(S) : Masaki Okada et al.

It is certified that error appears in the above-identified patent and that said Letters Patent is hereby corrected as shown below:

Title Page, [56] References cited, after line 1, insert --

4,537,169  8/19/85  Tsugi et al. ... 123/325--;

Title Page, Col. 2, after line 1, insert

--FOREIGN DOCUMENTS 210833    2/1987    Europe.

3539782   5/1987    Germany.

294985    12/1988   Japan.--

Col. 6, line 32, "rotate" should be --rate--; and line 38, "i" should be --in--.

Signed and Sealed this

Thirty-first Day of August, 1993

*Attest:*

BRUCE LEHMAN

*Attesting Officer*    *Commissioner of Patents and Trademarks*